United States Patent [19]

Fowler

[11] Patent Number: 5,403,528
[45] Date of Patent: Apr. 4, 1995

[54] METHOD FOR USE IN PACKAGING AND/OR STORING ATACTIC POLYPROPYLENE OR OTHER AMORPHOUS POLY ALPHA OLEFINS

[75] Inventor: J. Nick Fowler, Odessa, Tex.

[73] Assignee: Rexene Corporation, Dallas, Tex.

[21] Appl. No.: 934,869

[22] Filed: Aug. 21, 1992

Related U.S. Application Data

[63] Continuation-in-part of Ser. No. 477,224, Feb. 8, 1990, abandoned, which is a continuation-in-part of Ser. No. 247,359, Sep. 21, 1988, abandoned, which is a continuation-in-part of Ser. No. 186,169, Apr. 26, 1988, abandoned.

[51] Int. Cl.⁶ .................... B29C 37/00; B28B 11/06
[52] U.S. Cl. .................... 264/130; 118/309; 118/312; 264/131; 264/142; 264/237; 425/90; 425/92; 425/311; 425/445; 427/180; 427/421
[58] Field of Search .............. 264/37, 130, 131, 142, 264/237, 517; 425/90, 92, 96, 104, 308, 310, 311, 313, 445, 377, 378.1; 427/180, 189, 398.1, 421, 427; 118/309, 312

[56] References Cited

U.S. PATENT DOCUMENTS

| | | | |
|---|---|---|---|
| 1,164,397 | 12/1915 | Richardson | 264/148 |
| 1,779,301 | 10/1930 | Welter | 252/134 |
| 2,021,961 | 11/1935 | MacFarlane | 264/142 |
| 2,215,435 | 9/1940 | Hale | 264/142 |
| 2,286,405 | 6/1942 | Gordon | 264/142 |
| 2,319,859 | 5/1943 | Hale | 264/142 |
| 2,343,829 | 3/1944 | Clayton | 264/143 |
| 2,422,480 | 6/1947 | Gordon | 264/148 |
| 2,889,581 | 6/1959 | Vanderhoof | 264/148 |
| 2,895,939 | 7/1959 | Stober et al. | 427/180 |
| 2,952,038 | 9/1960 | Goins et al. | 264/148 |
| 3,108,320 | 10/1963 | Daester | 425/311 |
| 3,193,601 | 7/1965 | Billingsley | 425/313 |
| 3,213,170 | 10/1965 | Erdmenger | 425/311 |
| 3,217,360 | 11/1965 | Mason | 264/142 |
| 3,359,128 | 12/1967 | Humphrey et al. | 427/180 |
| 3,446,642 | 5/1969 | Webb | 427/185 |
| 3,519,706 | 7/1970 | Pantsios | 264/143 |
| 3,528,841 | 9/1970 | Donaldson | 264/142 |
| 3,530,491 | 9/1970 | Rejsa | 264/142 |
| 3,605,835 | 9/1971 | Holz | 425/308 |
| 3,634,570 | 1/1972 | Himelreich | 264/142 |
| 3,646,184 | 2/1972 | Nagao et al. | 264/142 |
| 3,670,467 | 6/1972 | Walker | 264/143 |
| 3,687,699 | 8/1972 | Prosser et al. | 427/180 |
| 3,803,285 | 4/1974 | Jensen | 264/143 |
| 3,892,834 | 7/1975 | Pritchard | 264/142 |
| 3,927,166 | 12/1975 | Tomoda et al. | 264/143 |
| 3,952,080 | 4/1976 | Backlund et al. | 264/143 |
| 4,024,312 | 5/1977 | Korpman | 428/343 |
| 4,101,484 | 7/1978 | Doss | 524/271 |
| 4,117,645 | 10/1978 | Phillips | 264/142 |
| 4,122,135 | 10/1978 | Valoti et al. | 264/140 |
| 4,179,255 | 12/1979 | Hale | 264/142 |
| 4,240,779 | 12/1980 | Turk | 425/313 |
| 4,245,972 | 1/1981 | Anders | 425/377 |
| 4,247,502 | 1/1981 | Loechell | 264/130 |
| 4,251,201 | 2/1981 | Krysiak | 425/311 |
| 4,264,554 | 4/1981 | Hale | 264/142 |
| 4,271,213 | 6/1981 | Grimm et al. | 427/222 |
| 4,284,597 | 8/1981 | Stein | 264/130 |
| 4,385,016 | 5/1983 | Gwinn | 264/142 |
| 4,536,146 | 8/1985 | Hernandez et al. | 425/311 |
| 4,636,301 | 1/1987 | Laramore | 425/104 |
| 4,737,092 | 8/1988 | Bullick | 425/310 |
| 4,767,305 | 8/1988 | Tashiro | 264/148 |
| 5,041,251 | 8/1991 | McCoskey et al. | 264/142 |

FOREIGN PATENT DOCUMENTS

| | | | |
|---|---|---|---|
| 0236657 | 9/1987 | European Pat. Off. | 264/130 |
| 57208128 | 6/1984 | Japan . | |
| 928120 | 6/1963 | United Kingdom | 264/130 |

*Primary Examiner*—Jay H. Woo
*Assistant Examiner*—Robert B. Davis
*Attorney, Agent, or Firm*—Harold E. Meier

[57] ABSTRACT

Packaging and/or storing atactic polypropylene or other amorphous poly alpha olefins is accomplished by first heating a mass of the olefin material to a molten state and then cooling the molten mass of olefin material to an extrusion temperature. Next, the formless mass of atactic polypropylene is extruded and cut into a succession of pellets. Inert dust-like material is sprayed onto the cutting surfaces and the surface of the olefin material so that the natural tendency of the material to stick to itself and to other objects is avoided.

24 Claims, 3 Drawing Sheets

METHOD FOR USE IN PACKAGING AND/OR STORING ATACTIC POLYPROPYLENE OR OTHER AMORPHOUS POLY ALPHA OLEFINS

RELATED APPLICATIONS

This application is a continuation-in-part of application Ser. No. 07/477,224, filed Feb. 8, 1990, now abandoned and entitled "Improved Method For Use In Packaging And/Or Storing Atactic Polypropylene Or Other Amorphous Poly Alpha Olefins." Application Ser. No. 07/477,224, is a continuation-in-part application of then application Ser. No. 07/247,359, filed Sep. 21, 1988, now abandoned and entitled "Improved Method And Apparatus For Use In Packaging And/Or Storing Atactic Polypropylene." And application Ser. No. 07/247,359, is a continuation-in-part of then application Ser. No. 07/186,169, filed Apr. 26, 1988, and entitled "Improved Method And Apparatus For Use In Packaging And/Or Storing Atactic Polypropylene," now abandoned.

TECHNICAL FIELD

This invention relates to an improved method for use in packaging and/or storing atactic polypropylene or other amorphous poly alpha olefins, and more specifically, to a method for use in packaging and/or storing olefins characterized by high surface tack, low thermal conductivity, and only moderate increases in viscosity or form-retention in response to large temperature reductions.

BACKGROUND OF THE INVENTION

Atactic polypropylene is a non-crystalline, naturally occurring by-product from the manufacture of the elastomer roofing material polypropylene. More recently, atactic polypropylene has been manufactured using atactic copolymers of ethylene and propylene. These forms are known as atactic poly alpha olefins and can be made "adhesive grade" with the addition of polybutene. Adhesive grade atactic poly alpha olefins have broad usage in the adhesive industry.

Atactic polypropylene, a natural adhesive, is sufficiently tacky at room temperature so as to stick to itself and most other objects. This characteristic makes the material extremely difficult to handle and store in a usable form. Additionally, atactic polypropylene is self-insulating, thus requiring large, complicated and expensive facilities and equipment to maintain large volumes of the material in a molten state.

Prior methods of handling and storing this material have met with dismal success. Efforts to package the material in relatively small cardboard containers are expensive, complicated and involve the removal of the container from the atactic polypropylene before use. Additionally, methods of handling and storing the material in the form of thin slabs do not eliminate the problems associated with the natural tackiness of the material. The slabs still stick to each other and to other objects they contact. Finally, co-extruding the material within a polyethylene sheath and cutting it into small segments is expensive and must be done at a relatively high temperature. Additionally, the cut ends of the segments leave the material exposed, presenting the traditional problems associated with the natural tackiness of the material.

Furthermore, traditional methods of packaging and/or storing materials of extreme tackiness incorporating methods of cutting or shearing the materials are limited when applied to atactic polypropylene olefins since atactic polypropylene olefins smear at form-retention temperatures.

Finally, none of the above-referenced methods are improved by operation at a reduced temperature. Atactic polypropylene olefins have a very flat temperature to viscosity relationship, making even large changes in temperature result in relatively small increases in viscosity. Consequently, operation of these previously discussed methods are uneconomical at the temperatures needed to solve the viscosity-related problems with packaging and storing the materials.

Thus a need has arisen for a method and device for packaging and/or storing atactic polypropylene or other amorphous poly alpha olefins truly providing a simple, inexpensive and effective solution to the aforementioned problems and obstacles.

SUMMARY OF THE INVENTION

The present invention overcomes the foregoing and other problems associated with the prior art by providing a method and device of packaging and/or storing atactic polypropylene or other amorphous poly alpha olefins at a temperature well above the form-retention temperature of the material. The present invention accomplishes this by first heating a mass of the olefin material to a molten state and then cooling the molten mass to an extrusion temperature above the olefin material's form-retention temperature. The formless mass of olefin material is then extruded through a plurality of orifices in an extrusion head. A reciprocating knife is moved across the orifice opening at a controllable rate, cutting the extruding formless mass into a succession of pellets of suitable size and shape for packaging, handling and storing. The size of the orifices and speed of the knife are adjustable so as to permit the formation of variety of pellet sizes of the olefin material.

As the olefin material is extruded, the surface of the olefin material and the surface of the knife are substantially covered with an inert dust-like material. The dust-like material is blown onto the surfaces of the extruding olefin material and knife either in dry or liquid form. One embodiment of the invention blows the inert dust-like material on the knife and extruding olefin material in a dry form. Another embodiment of the invention mixes the inert dust-like material with a liquid to form a slurry of the inert dust-like material. In this embodiment, the slurry is then blown onto the surface of the knife and the extruding olefin material. In both embodiments, means are provided for the capture and reuse of the dust-like material.

This inert dust-like material allows the knife to cut through the olefin material without smearing and covers the exterior of the cut pellets such that they do not stick to each other or other objects. Furthermore, since the dust-like material is inert to the olefin material, it does not require removal before the olefin material can be used.

The use of this inert dust-like material allows the olefin material to be extruded and cut, forming nonsticking pellets even at a temperature well above the olefins material's form-retention temperature.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
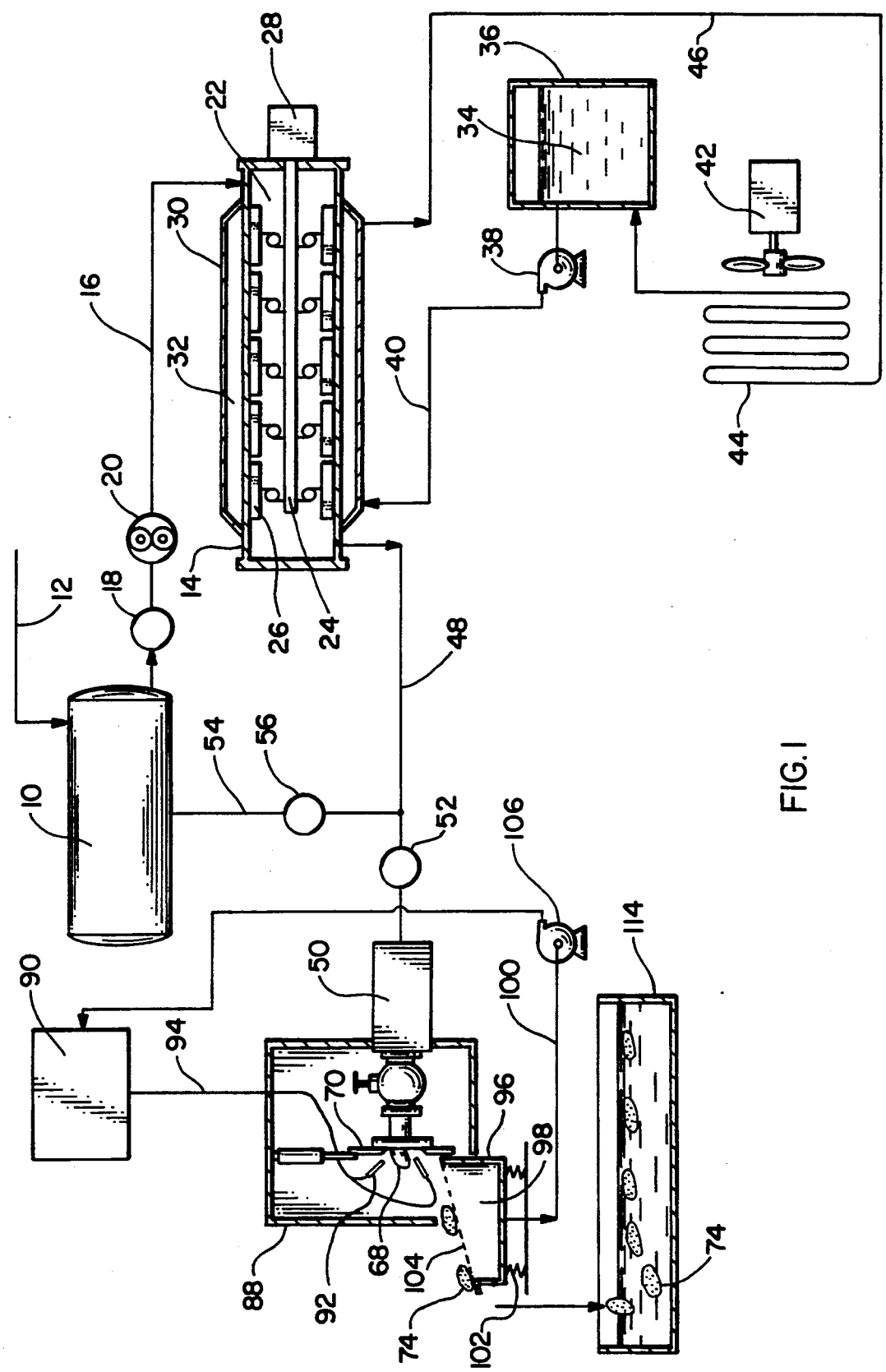
FIG. 1 is a diagrammatic view of the invention, illustrating a first embodiment.

Referring to FIG. 1, shown is an apparatus utilizing an embodiment of the invention. A holding tank 10 holds and heats atactic polypropylene that is delivered to the holding tank through a line 12. The stored atactic polypropylene is maintained at a molten temperature (approximately 375 degrees Fahrenheit) and, when desired, is pumped to a heat exchanger 14 through a conduit 16. The conduit 16 includes a valve 18 and a pump 20 for controlling the transfer of atactic polypropylene to the heat exchanger 14.

As the atactic polypropylene enters an inner chamber 22 of the heat exchanger 14, a central shaft 24 rotates a plurality of scrapers 26 along the inside surface of the heat exchanger 14. The shaft 24 and scrapers 26 are driven by a motor 28 and prevent the molten atactic polypropylene from sticking to the walls of the heat exchanger 14. The inner chamber 22 of the heat exchanger 14 is surrounded by an outer chamber 30, forming an annular space 32. A coolant 34, delivered from a reservoir tank 36 via a pump 38 and a supply conduit 40, is circulated through the annular space 32 to lower the temperature of the atactic polypropylene to a temperature below a molten temperature, but above the form-retention temperature of the material (approximately 180–210 degrees Fahrenheit). After circulating through the annular space 32, the coolant 34 is cooled by means of a fan 42 and a coil 44 before it is returned to the reservoir tank 36 via a return conduit 46. The fan 42 cools the coolant 34 by circulating air over the surface of the coolant-containing coil 44. Any suitable coolant can be utilized for purposes of cooling the coolant prior to its return to the reservoir tank 36.

Once the atactic polypropylene is cooled in the heat exchanger 14, it is fed via a feed conduit 48 to an extrusion head 50. The feed conduit 48 includes a feed valve 52 for controlling the flow of atactic polypropylene from the heat exchanger 14 to the extrusion head 50. Ideally, the heat exchanger 14 and the extrusion head 50 are located in close proximity to each other so that no appreciable temperature change will occur in the atactic polypropylene as it travels through the feed conduit 48. Another conduit 54 links the feed conduit 48 and the holding tank 10. A control valve 56 governs the flow of atactic polypropylene from the feed conduit 48 to the holding tank 10. During operation of the invention, the feed valve 52 is open and the control valve 56 is closed. During periods of nonuse, the feed valve 52 is closed and the control valve 56 is open so as to return the atactic polypropylene to the holding tank 10.

Figure 2:
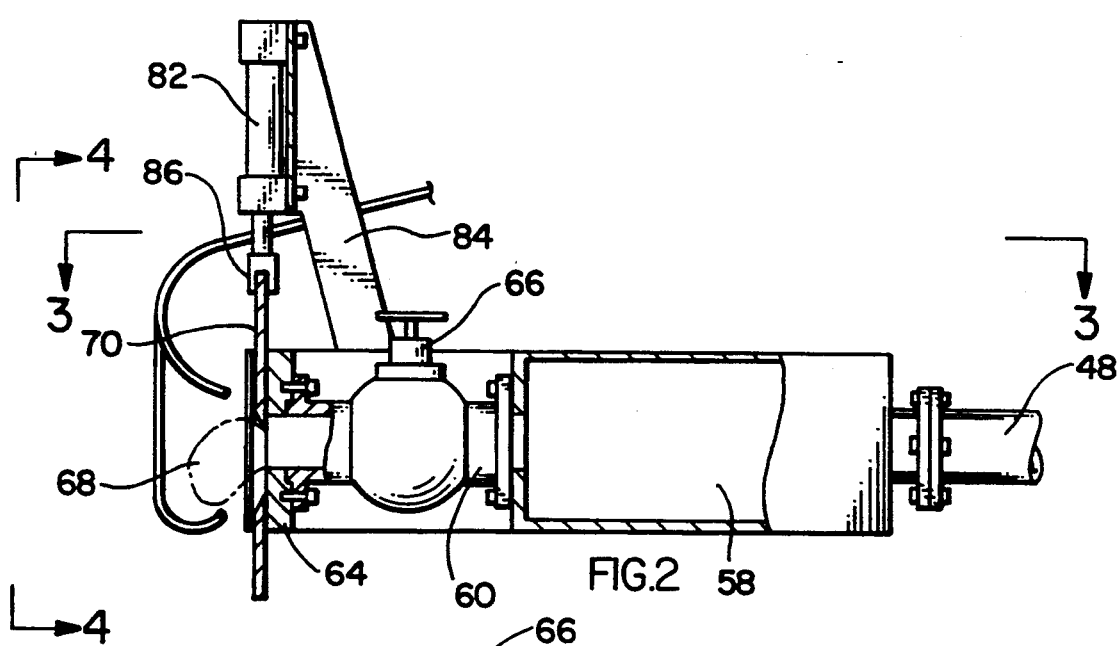
FIG. 2 is a side view, partly in section, of the extrusion head and dust-like material delivery means of a first embodiment of the invention.
Figure 3:
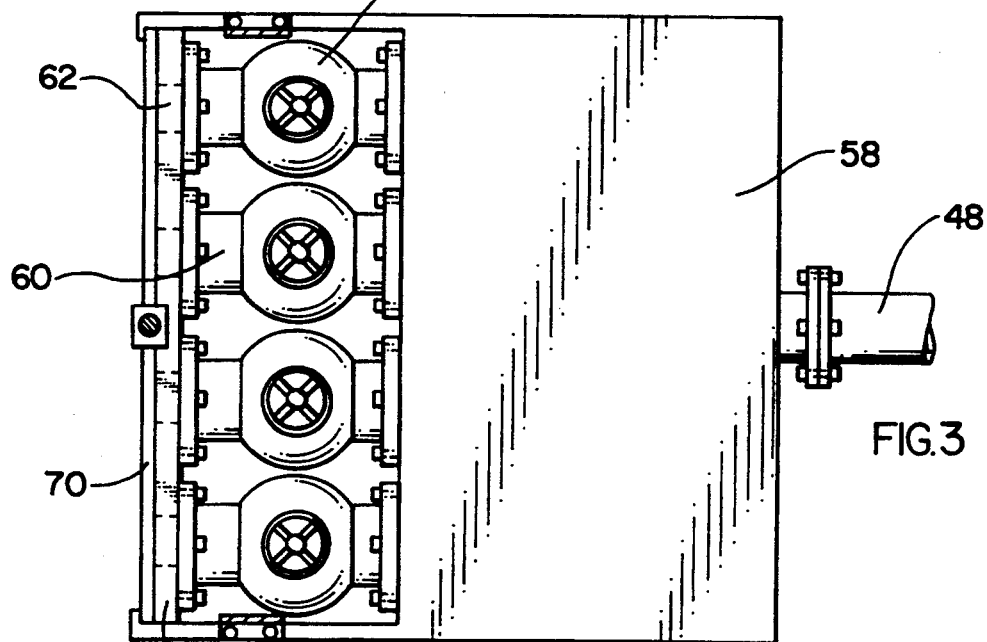
FIG. 3 is a top view of the extrusion head of the invention.

As best illustrated in FIGS. 2 and 3, the extrusion head 50 includes a receiving chamber 58, four conduit tubes 60, and four orifices 62 in a common wall 64 located opposite the receiving chamber 58. As the atactic polypropylene is fed to the extrusion head 50 via the feed conduit 48, it travels into the receiving chamber 58, through the four conduit tubes 60 and out through the four orifices 62 in the common wall 64. A valve 66 is present in each of the conduit tubes 60 for regulating the flow of the atactic polypropylene through the extrusion head 50.

As illustrated in FIG. 2, when the valve 66 is open, a formless mass 68 of the atactic polypropylene is extruded from the extrusion head 50 at each of the orifices 62. Although the extrusion head 50 shown includes four orifices 62 approximately two (2) inches in diameter, it is understood that any number and/or size of extrusion head orifices could be utilized, if desired.

Figure 4:
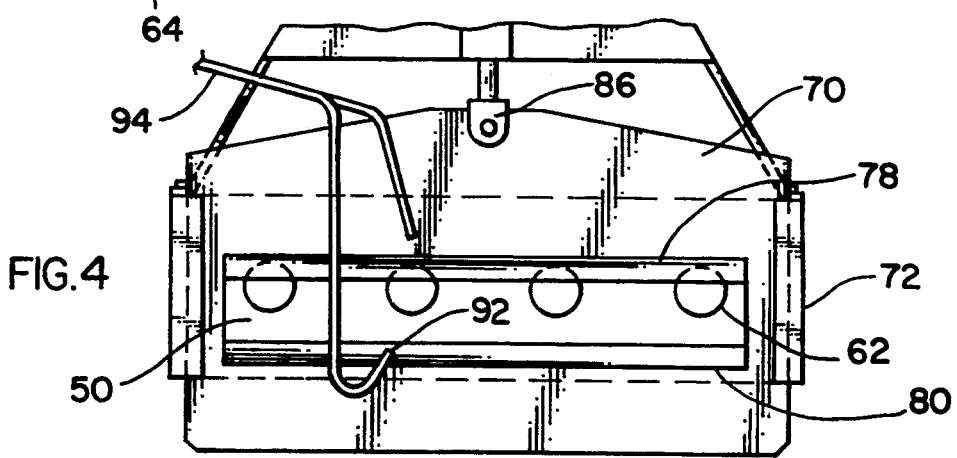
FIG. 4 is an end view of the extrusion head of the invention, illustrating the reciprocating cutting blade.

The extrusion head 50 further includes a knife 70 mounted laterally across the front of the extrusion head 50, adjacent to the orifices 62. The knife 70 is mounted within a guide 72 (FIGS. 2 and 4) along each side of the common wall 64 such that reciprocation of the knife 70 cuts the protruding formless mass 68 into successive pellets 74 (FIG. 1). The knife 70 has a longitudinally-extending opening 76. The extruded formless mass 68 extends through this opening 76 and is cut as the knife 70 reciprocates. Cutting edges located at both the upper portion 78 and lower portion 80 of the opening 76 in the knife 70 allow the knife 70 to cut the extruding formless mass 68 into successive pellets 74 on both the upstroke and downstroke of the knife 70.

Referring again to FIG. 2, reciprocation of the knife 70 is accomplished by an air cylinder 82 mounted on the extrusion head 50 by a bracket 84 and connected to the upper edge of the knife 70 by a clevis 86. Although the knife 70 shown reciprocates and includes dual cutting edges, it is understood that any suitable cutting method could be utilized, if desired.

Figure 5:
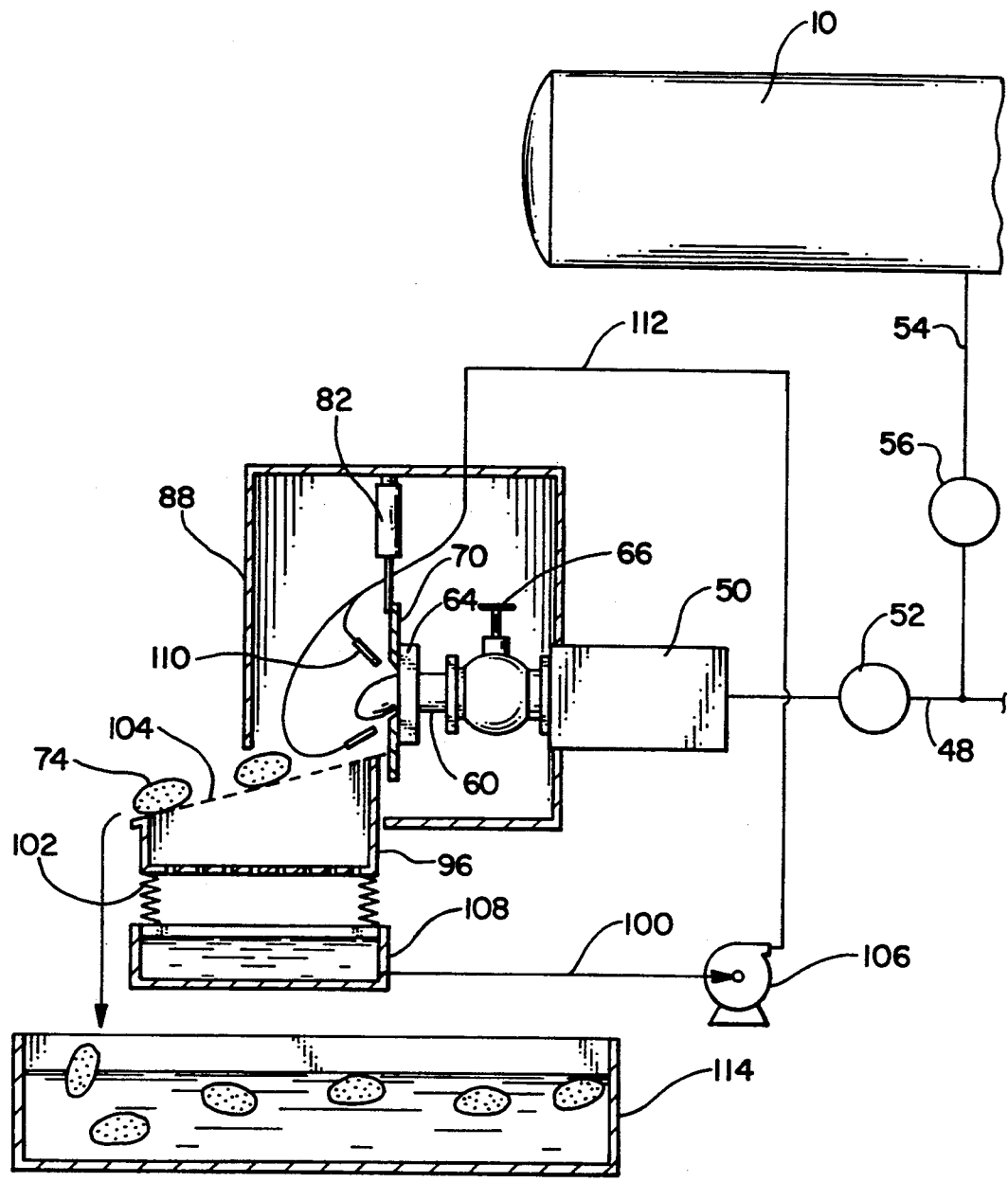
FIG. 5 is a diagrammatic view of the invention, illustrating a second embodiment.

As is shown in FIG. 5, an enclosure 88 substantially surrounds the orifices 62 and knife 70 of the extrusion head 50. The enclosure 88 may be constructed on any suitable material such as plastic, heavy fabric or light metal. As illustrated in the embodiment of the invention shown in FIG. 1, a reservoir 90 contains a dust-like material to be delivered to a pair of nozzles 92 via a hose 94. The nozzles 92 are aimed at the knife 70 and orifices 62 of the extrusion head 50. Although only two nozzles are shown, it will be apparent that any number of nozzles or other delivering means can be utilized, if desired.

The dust-like material is sprayed from the nozzles 92, substantially covering the surfaces of the cutting edges of the knife 70 and the extruding formless mass 68 of atactic polypropylene. The addition of the dust-like material to these surfaces allows the knife 70 to cut cleanly through the formless mass 68 and allows the pellets 74 to be handled and stored without sticking to each other or to other objects. The dust-like material may be any material inert to atactic polypropylene, such as talc, polyethylene or polypropylene. Such materials ideally include dust particles having fine fibers tending to interlock and forming a substantially complete cover on any surface. Since the dust-like material is inert to atactic polypropylene, it does not need to be removed before the atactic polypropylene can be packaged, stored or used.

As illustrated in FIGS. 1 and 5, the dust-like material-covered pellets 74 drop from the knife 70 onto a shaker 96, where excess dust-like material is dropped from the pellets 74 through holes in the top of the shaker 96 into a container 98 within the shaker 96. The excess dust-like material is then returned via a return conduit 100 to the reservoir 90. The shaker 96 includes four spring-like legs 102 and a top portion 104 constructed from a mesh-like material and sloping away from the extrusion head. A pump 106 located along the return conduit 100 returns the excess dust-like material back to the reservoir 90.

In FIG. 5, a second embodiment of the invention is partially shown. In this embodiment of the invention, the dust-like material is combined with water and a surfactant in a tank 108 to form a slurry of the material. The slurry of the dust-like material should contain at least seventy-five (75) percent by volume of the dust-like material. Not unlike the first embodiment, the slurry is sprayed onto the cutting surfaces of the knife 70 and emerging pellets 74 by a pair of nozzles 110 aimed at the knife 70 and orifices 62 of the extrusion head 50. The slurry of dust-like material is fed to the nozzles 110 by a hose 112, and excess slurry is shaken off the emerging pellets 74 and returned to tank 108. Although the slurry described herein is formed by mixing water with the dust-like material and a surfactant, it will be apparent that other suitable liquids can be used in the formation of the slurry, if desired.

In both embodiments, the vibrating motion of the shaker 92 propels the pellets 74 down the sloping top portion 104 of the shaker 92. Once the pellets 74 descend the downward slope of the shaker 92, they drop into a bath 114 where they are cooled by water or other suitable liquid coolant. The pellets 74 are cooled in the bath 114 until they reach a temperature of approximately eighty (80) degrees Fahrenheit. Since the surface of the pellets 74 are covered with the dust-like material, the pellets 74 do not stick to each other or other objects. Once the pellets 74 have cooled to the appropriate temperature, they are removed from the bath 114 and are ready to be packaged and/or stored.

Although only preferred embodiments of the invention have been described, it should be understood that the invention is not limited to the embodiments disclosed, but is intended to embrace any alternative, modifications, rearrangements, or substitutions of parts or elements as fall within the scope and spirit of the invention.

I claim:

1. A method for processing an amorphous poly alpha olefin comprising the steps of:
    cooling a molten mass of the amorphous poly alpha olefin to an extrusion temperature;
    extruding the cooled amorphous poly alpha olefin through an orifice of an extrusion head;
    reciprocating a cutter across the orifice to cut the extruded amorphous poly alpha olefin into a succession of pellets;
    substantially covering the pellets with dust particles inert to the amorphous poly alpha olefin as the pellets pass through the orifice;
    removing the excess dust particles from the pellets; and
    cooling the pellets after removal of the dust particles therefrom.

2. The method as in claim 1, further comprising the steps of:
    heating the amorphous poly alpha olefin to a molten condition at approximately 375° F.; and
    cooling the amorphous poly alpha olefin to approximately 200° F. prior to extrusion through the orifice.

3. The method as in claim 1, further comprising the steps of:
    extruding the cooled amorphous poly alpha olefin in an enclosure adjacent to the extrusion head to surround the pellets and the cutter, and
    blowing the dust particles into the enclosure to substantially cover the pellets and the cutter.

4. The method as in claim 3, further including the step of:
    recovering the dust particles for reuse in the enclosure.

5. The method as in claim 1, wherein the dust particles comprise polypropylene.

6. A method for processing an amorphous poly alpha olefin comprising the steps of:
    cooling a molten mass of the amorphous poly alpha olefin to an extrusion temperature;
    extruding the cooled amorphous poly alpha olefin through a plurality of orifices in an extrusion head;
    cutting the extruded amorphous poly alpha olefin into a succession of pellets by reciprocating a knife across the orifices;
    mixing dust particles inert to the amorphous poly alpha olefin with water and a surfactant to form a slurry containing at least 75% by volume of dust particles;
    substantially covering the pellets with the slurry of dust particles as the pellets pass through the orifices;
    removing the excess slurry of dust particles from the pellets; and
    cooling the pellets after removal of the slurry of dust particles therefrom.

7. The method as in claim 6, further comprising the steps of:
    extruding the cooled amorphous poly alpha olefin in an enclosure adjacent to the extrusion head to surround the pellets and the knife; and
    blowing the slurry of dust particles into the enclosure to substantially cover the pellets and the knife.

8. The method as in claim 7, further including the step of:
    recovering the slurry to be returned for reuse in the enclosure.

9. The method as in claim 6, wherein the dust particles comprise amorphous polypropylene.

10. The method as in claim 6, wherein the step of extruding the cooled amorphous poly alpha olefin includes the step of extruding the amorphous poly alpha olefin through an opening in the knife.

11. A method for processing an amorphous poly alpha olefin comprising the steps of:
    heating the amorphous poly alpha olefin to a molten temperature;
    cooling the amorphous poly alpha olefin to an extrusion temperature;
    extruding the cooled amorphous poly alpha olefin through a plurality of orifices in an extrusion head;
    cutting the extruded amorphous poly alpha olefin into a succession of pellets by reciprocating a knife across the orifices;
    substantially covering the pellets with dust particles inert to the amorphous poly alpha olefin as the pellets pass through the orifice;
    removing the excess dust particles from the pellets; and
    cooling the pellets after removal of the excess dust particles therefrom.

12. The method as in claim 11, further including the step of:
reheating the amorphous poly alpha olefin during periods of non-extrusion.

13. An apparatus for processing an amorphous poly alpha olefin comprising:
means for cooling a mass of molten amorphous poly alpha olefin;
means for extruding the cooled amorphous poly alpha olefin through an orifice;
a knife for cutting the extruded amorphous poly alpha olefin;
means for reciprocating the knife across the orifice of the extruding means, said knife cutting the extruded amorphous poly alpha olefin into a succession of pellets;
means for spraying dust particles inert to the amorphous poly alpha olefin onto the pellets;
means for removing excess dust particles from the pellets;
means for capture and reuse of the removed dust particles; and
means for cooling the pellets after removal of the excess dust particles.

14. The apparatus of claim 13, wherein the extruding means includes:
a receiving chamber where the amorphous poly alpha olefin is held prior to extrusion;
an extrusion head for extruding amorphous poly alpha olefin from the receiving chamber;
a valve for the control of amorphous poly alpha olefin flow through the extrusion head; and
a plurality of orifices within the extrusion head.

15. The apparatus of claim 13, wherein the means for reciprocating the knife across the orifice includes a control means for varying the knife reciprocation rate.

16. The apparatus of claim 13, wherein the knife is mounted laterally across the orifice of the extrusion head, said knife having an opening through which the amorphous poly alpha olefin is extruded.

17. The apparatus of claim 16, wherein the knife includes cutting edges on the upper and lower edges of the opening for cutting a pellet of the extruded amorphous poly alpha olefin during each reciprocation stroke of the knife.

18. The apparatus of claim 13, wherein the means for spraying dust particles onto the pellets includes:
a nozzle for applying the dust particles to the pellets;
a hose for supplying the dust particles to the nozzle;
support means to position the nozzle to spray the inert dust particles onto the pellets; and
an enclosure substantially surrounding the nozzle and the extrusion orifice.

19. The apparatus of claim 13, wherein the means for capture and reuse of the dust particles includes:
a holding tank for holding the dust particles;
a capture receptacle, positioned below the means for removing, for collecting excess dust particles removed from the pellets; and
a conduit for returning the dust particles from the capture receptacle to the holding tank.

20. The apparatus of claim 13, wherein the means for cooling the pellets includes a water bath.

21. An apparatus for processing an amorphous poly alpha olefin comprising:
means for heating a mass of the amorphous poly alpha olefin;
a heat exchanger for cooling a molten mass of the amorphous poly alpha olefin;
an extrusion head including a plurality of orifices for extruding the cooled amorphous poly alpha olefin;
a reciprocating knife mounted laterally across the plurality of orifices of the extrusion head to cut the extruded amorphous poly alpha olefin into a succession of pellets;
an enclosure substantially surrounding the extrusion head and including at least one nozzle and at least one hose for spraying a slurry of dust particles inert to the amorphous poly alpha olefin onto the pellets;
means for removing and capturing the excess slurry of dust particles from the pellets; and
a water bath for cooling the pellets after removal of the excess slurry of dust particles.

22. The apparatus of claim 13 wherein the means for removing comprises a shaker for shaking the dusted pellets to remove the excess dust particles.

23. The method as in claim 1, wherein the dust particles comprise polyethylene.

24. The method as in claim 6, where the dust particles comprise polyethylene.

* * * * *